United States Patent
Ye et al.

(10) Patent No.: US 11,050,602 B2
(45) Date of Patent: Jun. 29, 2021

(54) METHODS AND COMMUNICATION APPARATUSES FOR BIT-TO-SYMBOL MAPPING

(71) Applicant: NTT DOCOMO, INC., Tokyo (JP)

(72) Inventors: Neng Ye, Beijing (CN); Dongbo Feng, Beijing (CN); Xiangming Li, Beijing (CN); Wenjia Liu, Beijing (CN); Xiaolin Hou, Beijing (CN); Qin Mu, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/650,839

(22) PCT Filed: Sep. 11, 2018

(86) PCT No.: PCT/CN2018/104926
§ 371 (c)(1),
(2) Date: Mar. 25, 2020

(87) PCT Pub. No.: WO2019/062535
PCT Pub. Date: Apr. 4, 2019

(65) Prior Publication Data
US 2020/0280476 A1 Sep. 3, 2020

(30) Foreign Application Priority Data
Sep. 27, 2017 (CN) .......................... 201710891072.3

(51) Int. Cl.
*H04L 27/20* (2006.01)
*H04L 27/34* (2006.01)
*H04L 27/36* (2006.01)

(52) U.S. Cl.
CPC ...... *H04L 27/3433* (2013.01); *H04L 27/2021* (2013.01); *H04L 27/36* (2013.01)

(58) Field of Classification Search
CPC .. H04L 27/3433; H04L 27/2021; H04L 27/36
(Continued)

(56) References Cited

U.S. PATENT DOCUMENTS

| | | | |
|---|---|---|---|
| 2003/0081690 A1* | 5/2003 | Kim | H04L 1/0066 375/264 |
| 2009/0041092 A1* | 2/2009 | Kim | H04L 5/0037 375/146 |

(Continued)

FOREIGN PATENT DOCUMENTS

| | | |
|---|---|---|
| CN | 1335722 A | 2/2002 |
| CN | 102025470 A | 4/2011 |
| CN | 106877980 A | 6/2017 |

OTHER PUBLICATIONS

International Search Report for corresponding International Application No. PCT/CN2018/104926, dated Nov. 30, 2018 (5 pages).

*Primary Examiner* — Ted M Wang
(74) *Attorney, Agent, or Firm* — Osha Bergman Watanabe & Burton LLP

(57) ABSTRACT

Methods and communication apparatuses are presented for bit-to-symbol mapping. The method for bit-to-symbol mapping according to one example of the present invention includes: obtaining a plurality of base constellation maps; and mapping an input bit sequence by using the plurality of base constellation maps to generate symbols to be transmitted.

14 Claims, 6 Drawing Sheets

200

Determining a target constellation map in the plurality of base constellation maps according to a part of information bit groups of the plurality of information bit groups — S201

Mapping other information bit groups except the part of information bit groups by using the target constellation map to generate the symbol to be transmitted — S202

(58) Field of Classification Search
USPC .......................................................... 375/262
See application file for complete search history.

(56) References Cited

U.S. PATENT DOCUMENTS

2010/0246719 A1* 9/2010 Ko ...................... H04L 27/2657
375/303
2014/0254707 A1 9/2014 Wang et al.

* cited by examiner

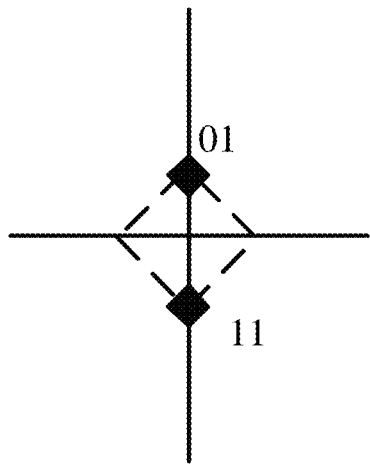 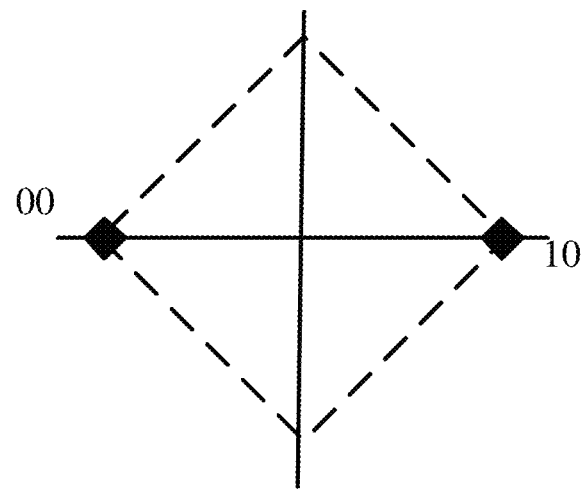
FIG. 3a  FIG. 3b
400
Mapping corresponding information bit groups by using the determined constellation maps, respectively, to obtain initial constellation points ~S401
Superimposing the obtained initial constellation points to generate the symbols to be transmitted ~S402
FIG. 4

Constellation map 710

Constellation map 720    Constellation map 730

METHODS AND COMMUNICATION APPARATUSES FOR BIT-TO-SYMBOL MAPPING

CROSS-REFERENCE TO RELATED APPLICATIONS

This application is a 371 U.S. National Phase of International Application No. PCT/CN2018/104926, filed on Sep. 11, 2018, which claims priority to Chinese Application No. 201710891072.3, filed on Sep. 27, 2017. The entire disclosures of the above applications are incorporated herein by reference.

TECHNICAL FIELD

The present disclosure relates to a field of wireless communication, and in particular to methods and communication apparatuses for bit-to-symbol mapping.

BACKGROUND

In a communication system, bit-to-symbol mapping is performed via a constellation map, so that an input bit sequence carrying information is mapped into symbols suitable for transmission, where each point in the constellation map corresponds to one value of an output symbol. In a traditional communication system based on grant for data transmission, a single constellation map such as BPSK or QPSK is usually used for bit-to-symbol mapping. In the communication system based on grant for data transmission, the number of UEs is fixed when data transmission is performed.

In recent years, in order to reduce control signaling and further improve performance of communication systems, a grant-free data transmission method has been proposed. Unlike the communication system based on grant for data transmission, in a communication system based on grant-free for data transmission, the number of UEs is uncertain when data transmission is performed. Therefore, a mapping method for the communication system based on grant for data transmission is not suitable for the communication system based on grant-free for data transmission.

SUMMARY OF THE DISCLOSURE

According to one aspect of the present disclosure, a method for bit-to-symbol mapping is provided, comprising: obtaining a plurality of base constellation maps; mapping an input bit sequence by using the plurality of base constellation maps to generate symbols to be transmitted.

According to another aspect of the present disclosure, a method for bit-to-symbol mapping is provided, wherein one symbol includes a plurality of sub-channels, the method comprising: determining priority of data in an input bit sequence; and mapping the input bit sequence by using a constellation map according to the determined priority and reliability of the respective sub-channels to generate symbols to be transmitted.

According to another aspect of the present disclosure, a communication apparatus is provided, comprising: an obtaining unit configured to obtain a plurality of base constellation maps; a mapping unit configured to map an input bit sequence by using the plurality of base constellation maps to generate symbols to be transmitted.

According to another aspect of the present disclosure, a communication apparatus is provided, comprising: a determining unit configured to determine priority of data in an input bit sequence; and a mapping unit configured to map the input bit sequence by using a constellation map according to the determined priority and reliability of respective sub-channels included in one symbol to generate symbols to be transmitted.

BRIEF DESCRIPTION OF THE DRAWINGS

The above and other objects, features and advantages of the present disclosure will become clearer by describing embodiments of the present disclosure in details with reference to the accompanying drawings.

FIG. 3a illustrates a constellation map of $f_{b2=1}$ according to one example of the present disclosure.

FIG. 3b illustrates a constellation map of $f_{b2=0}$ according to one example of the present disclosure.

FIG. 4 is a flowchart illustrating a method for mapping an input bit sequence by using a plurality of base constellation maps according to another embodiment of the present disclosure.

DESCRIPTION OF THE EMBODIMENTS

Figure 1:
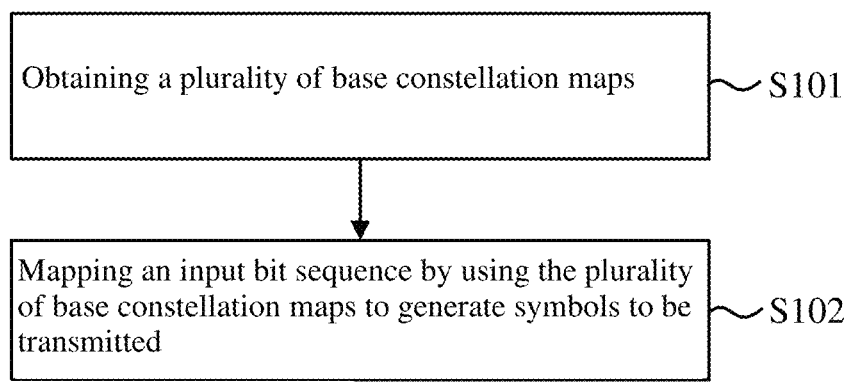
FIG. 1 is a flowchart illustrating a method for bit-to-symbol mapping according to one embodiment of the present disclosure.

Methods and communication apparatuses for bit-to-symbol mapping according to the embodiments of the present disclosure will be described below with reference to the accompanying drawings. Like reference numerals refer to like elements throughout the accompanying drawings. It should be understood that the embodiments described herein are merely illustrative and should not be construed as limiting the scope of the present disclosure. Furthermore, a UE described herein may include various types of user terminals, for example, a mobile terminal (or referred to as a mobile station) or a fixed terminal. However, for convenience, the UE and the mobile station sometimes may be used interchangeably hereinafter.

Methods and communication apparatuses for bit-to-symbol mapping according to the embodiments of the present disclosure may be used for various data transmission modes.

Preferably, it may be used for a grant-free data transmission mode. For example, it may be used for a grant-free uplink data transmission mode.

A method for bit-to-symbol mapping according to one embodiment of the present disclosure will be described below with reference to FIG. 1. FIG. 1 is a flowchart illustrating the method 100 for bit-to-symbol mapping according to one embodiment of the present disclosure. In the example shown in FIG. 1, one symbol may optionally include a plurality of sub-channels, and the number of bits included in each of the plurality of sub-channels may be the same or different. For example, one symbol may include 3 sub-channels, and each sub-channel may include one bit. As another example, one symbol may include 2 sub-channels, where one sub-channel includes one bit and the other sub-channel includes two bits. As shown in FIG. 1, in step S101, a plurality of base constellation maps are obtained. According to one example of the present disclosure, a base constellation map may be an initial constellation map such as BPSK, QPSK, 16QAM, and the like. Alternatively, in addition to the initial constellation map, a base constellation may further include an adjustment factor such as a power factor and/or a phase rotation.

According to another example of the present disclosure, the method shown in FIG. 1 may further comprise generating a plurality of information bit groups according to an input bit sequence. In this case, in step S101, base constellation maps corresponding to respective information bit groups of the plurality of information bit groups may be determined.

For example, the base constellation maps corresponding to the plurality of information bit groups generated according to the input bit sequence may be preset. In step S101, the base constellation maps corresponding to the respective information bit groups of the plurality of information bit groups may be determined according to a preset setting. For example, it may be preset that a first information bit group of the plurality of information bit groups generated according to one input bit sequence corresponds to a BPSK constellation map, and a second information bit group of the bit sequence corresponds to a QPSK constellation map. Accordingly, in step S101, a BPSK constellation map may be determined for the first information bit group, and a QPSK constellation map may be determined for the second information bit group. Furthermore, each of the plurality of constellation maps may be the same. For example, it may be preset that the first information bit group of the plurality of information bit groups generated according to the input bit sequence corresponds to a BPSK constellation map, and the second information bit group of the plurality of information bit groups generated according to the input bit sequence corresponds to a BPSK constellation map. In step S101, according to a preset setting, a BPSK constellation map may be determined for a first bit, and a BPSK constellation map may also be determined for a second bit.

Furthermore, according to another example of the present disclosure, the plurality of base constellation maps may also be candidate base constellation maps for one input bit sequence. As will be described later, base constellation maps used for mapping of the input bit sequence may be selected from the candidate base constellation maps according to a part of information bit groups of the plurality of information bit groups generated based on the input bit sequence.

Then, in step S102, the input bit sequence is mapped by using the plurality of base constellation maps to generate symbols to be transmitted.

As described above, according to one example of the present disclosure, the method shown in FIG. 1 may further comprise generating the plurality of information bit groups according to the input bit sequence. Furthermore, the plurality of base constellation maps obtained in step S101 may be candidate base constellation maps. In step S102, base constellation maps may be selected within the plurality of base constellation maps according to the part of information bit groups of the plurality of information bit groups, so as to obtain mapped symbols according to the selected base constellation maps.

Figure 2:
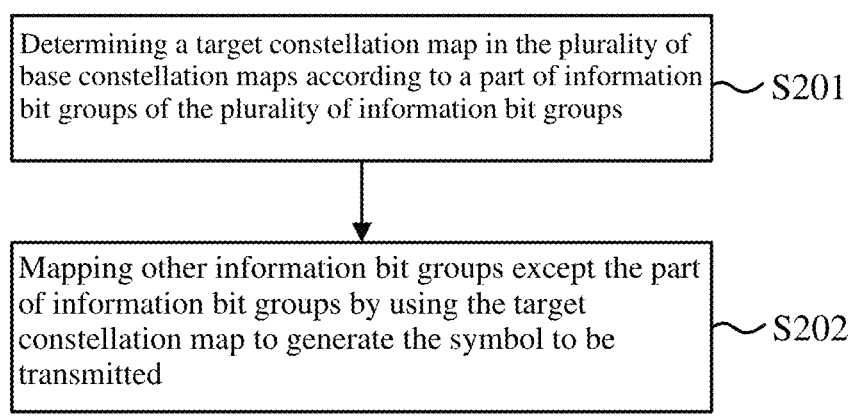
FIG. 2 is a flowchart illustrating a method for mapping an input bit sequence by using a plurality of base constellation maps according to one embodiment of the present disclosure.

Specifically, FIG. 2 is a flowchart illustrating a method 200 for mapping the input bit sequence by using the plurality of base constellation maps according to one embodiment of the present disclosure. As shown in FIG. 2, in step S201, a target constellation map is determined in the plurality of base constellation maps according to the part of information bit groups of the plurality of information bit groups. According to one example of the present disclosure, the part of information bit groups of the plurality of information bit groups may be one or more information bit groups of the plurality of information bit groups, for example, the first information bit group of the input bit sequence, the first two information bit groups of the input bit sequence, or the last one or more information bit groups of the input bit sequence.

According to another example of the present disclosure, the target constellation map may be determined in the plurality of base constellation maps according to bit values of the part of information bit groups of the plurality of information bit groups. For example, a correspondence relationship between bit values and respective constellation maps of the plurality of base constellation maps may be preset. In step S201, the target constellation map may be determined in the plurality of base constellation maps according to specific bit values of some bits of the input bit sequence according to the preset correspondence relationship.

For example, a constellation map corresponding to the bit value of 1 may be preset as a BPSK constellation map, and a constellation map corresponding to the bit value of 0 may be preset as a QPSK constellation map. In step S201, according to bit values of a first information bit group of the plurality of information bit groups, a target constellation map corresponding to the bit values may be determined from the plurality of base constellation maps.

As another example, as described above, each base constellation map includes an initial constellation map and adjustment factors including a power factor and/or a phase rotation and the like. Assuming that for an input bit sequence with 2 bits, it may be preset that:

$$f_{b_2=0}(b_1) = a_1 B(b_1),$$

$$f_{b_2=1}(b_1) = a_2 e^{-i\varphi} B(b_1), \quad (1)$$

where $b_1$ and $b_2$ are information bit groups of a plurality of information bit groups, $f_{b_2=0}$ is a corresponding base constellation map when bit values of a second information bit groups of the plurality of information bit groups are 0, and $f_{b_2=1}$ is a corresponding base constellation map when bit values of the second information bit groups of the plurality of information bit groups are 1, $a_1$ and $a_2$ are power factors, $\|a1, a2\|=1$, $\varphi$ is a phase rotation, and $B(\ )$ is a BPSK constellation map. In Formula (1), description is made by taking the example that the second information bit group includes 1 bit. Alternatively, more bits may be included in an information bit group.

FIG. 3a illustrates a constellation map of $f_{b2=1}$ according to one example of the present disclosure. FIG. 3b illustrates a constellation map of $f_{b2=0}$ according to one example of the present disclosure. In the examples shown in FIG. 3a and FIG. 3b, one or more bits in one symbol may be a sub-channel. For example, independently coded complete codewords may be transmitted in each sub-channel. As shown in FIG. 3a and FIG. 3b, distances between constellation points corresponding to mapped symbols obtained by b1 may be adjusted by adjusting values of the power factors $a_1$ and $a_2$, so that different sub-channels of a symbol have different reliability, that is, rate splitting is achieved between different sub-channels of a symbol. Therefore, even in a case where conflicts occur among a plurality of users, degradation of performance and capacity may be avoided.

Specifically, as shown in FIG. 3a and FIG. 3b, the power factor $a_1 > a_2$, thus, the distance between the symbols 01 and 11 corresponding to constellation points in the constellation map of $f_{b2=1}$ is smaller than the distance between the symbols 00 and 10 corresponding to constellation points in the constellation map of $f_{b2=0}$, and therefore, the minimum Euclidean distance between the symbols corresponding to the second bit is greater than the minimum Euclidean distance between the symbols corresponding to the first bit. In other words, for a mapped symbol having 2 bits, reliability of the first bit is low and reliability of the second bit is high. The power factors and the phase rotation will be further described later.

In step S201, according to bit values of the second information bit group of the plurality of information bit groups, a target constellation map corresponding to the bit values may be determined from the two base constellation maps shown in the above Formula 1.

Then, in step S202, other information bit groups of the plurality of information bit groups except the part of information bit groups may be mapped by using the target constellation map to generate symbols to be transmitted, that is, to generate symbols corresponding to the entire input bit sequence. For example, assuming that two information bit groups are generated according to the input bit sequence, in step S201, the target constellation map may be determined from the plurality of base constellation maps according to the first information bit group, and then in step S202, corresponding symbols are determined in the target constellation map as symbols mapped by the entire input bit sequence according to the second information bit group.

In the example described according to FIG. 2, the target constellation map may be selected from the plurality of base constellation maps according to the part of information bit groups of the plurality of information bit groups generated based on the input bit sequence, to perform bit-to-symbol mapping, thereby bringing in better performance in any possible capacity region. It should be noted that although description is made in steps S201 and S202 with the example that the input bit sequence generates two information bit groups, the present disclosure is not limited thereto. For example, three information bit groups may be generated according to the input bit sequence, and the target constellation map is selected from the plurality of base constellation maps according to two information bit groups of the three information bit groups, and vice versa.

Furthermore, as described above, according to another example of the present disclosure, the plurality of base constellation maps may correspond to the respective information bit groups generated according to the input bit sequence, respectively. In this case, in step S102, the symbols corresponding to the entire input bit sequence may be generated by superimposing initial constellation points obtained by mapping of the respective bits. Specifically, FIG. 4 is a flowchart illustrating a method 400 for mapping the input bit sequence by using the plurality of base constellation maps according to another embodiment of the present disclosure.

As shown in FIG. 4, in step S401, corresponding bit information groups are mapped by using respective determined constellation maps to obtain initial constellation points. For example, according to a preset setting, a BPSK constellation map may be determined for the first information bit group, and a QPSK constellation map may be determined for the second information bit group. In step S401, the first information bit group may be mapped by using the BPSK constellation map to obtain first initial constellation points, and the second information bit group may be mapped by using the QPSK constellation map to obtain second initial constellation points.

Then in step S402, the obtained initial constellation points are superimposed to generate symbols to be transmitted. In the example described according to FIG. 4, initial constellation points corresponding to the respective information bit groups of the plurality of information bit groups generated according to the input bit sequence may be obtained according to the plurality of base constellation maps, and the symbols to be transmitted may be generated according to the initial constellation points, thereby bringing in better performance in any possible capacity region.

According to one example of the present disclosure, in step S402, the respective initial constellation points may be adjusted by adjustment factors, and then the adjusted initial constellation points are superimposed to generate the symbols to be transmitted. For example, the symbols to be transmitted may be generated according to the following Formula 2:

$$x = a_1 f_{b1}(b_1) + a_2 e^{-i\varphi} f_{b2}(b_2) + \ldots \quad (2)$$

where $b_1, b_2 \ldots$ are information bit groups of a plurality of information bit groups; $f_{b1}, f_{b2} \ldots$ are base constellation maps, and $f_{b1}, f_{b2}$ may be BPSK constellation maps, QPSK constellation maps and the like; $a_1, a_2 \ldots$ are power factors, $\|a_1, a_2, \ldots\| = 1$; $\varphi$ is a phase rotation.

Figure 5:
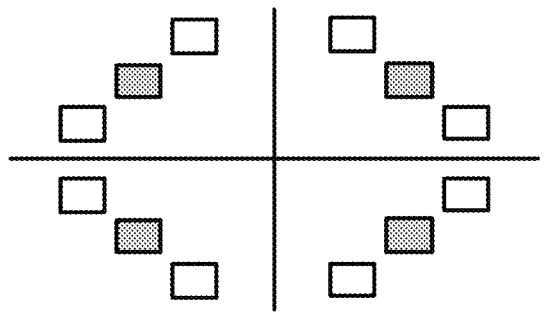
FIG. 5 is a schematic diagram illustrating superimposing initial constellation points generated according to BPSK and adjusted by adjustment factors on initial constellation points generated according to QPSK, according to one example of the present disclosure.

FIG. 5 is a schematic diagram illustrating superimposing initial constellation points generated according to BPSK and adjusted by adjustment factors on initial constellation points generated according to QPSK, according to one example of the present disclosure. In the example shown in FIG. 5, the initial constellation points generated according to QPSK are as shown by the 4 gray boxes in FIG. 5, and the initial constellation points generated according to BPSK are superimposed thereon to obtain constellation points, as shown by the 8 white boxes, that may correspond to symbols to be transmitted.

Furthermore, in the example shown in FIG. 5, two sub-channels may be included in a symbol, and one sub-channel includes 2 bits, and the other sub-channel includes one bit. Similar to the examples shown in FIG. 3a and FIG. 3b, in the example shown in FIG. 5, distances between constellation points corresponding to mapped symbols obtained by superimposing initial constellation points may be adjusted by adjusting values of the power factors $a_1$ and $a_2$, so that different sub-channels of a symbol have different reliability, that is, rate splitting is achieved between different sub-channels of a symbol. Therefore, even in a case where conflicts occur among a plurality of users, degradation of performance and capacity may be avoided.

As described in the examples described above in conjunction with FIGS. 2-5, in the examples according to the present disclosure, optionally, bit-to-symbol mapping may be performed through adjustment factors including power factors and/or phase rotations. According to one example of the present disclosure, the adjustment factors may be determined according to channel capacities required for respective sub-channels.

For example, different reliability may be preset for respective sub-channels of a symbol. Parameters such as Block Error Rates (BLERs) may be preset for the respective sub-channels of the symbol to indicate their reliability. Then, a corresponding system capacity is obtained according to the set reliability. For example, corresponding signal-to-interference-and-noise ratios (SINRs) may be determined according to the set reliability, and corresponding code rates may be obtained according to the determined SINRs to indicate the system capacity. Then, the adjustment factors are determined according to the obtained corresponding system capacity.

For example, for a fixed system noise, the power factors may be adjusted to meet the resultant system capacity. As another example, a phase rotation may be determined according to a channel noise. For example, the channel noise may be determined according to a received signal-to-noise ratio (SNR). Furthermore, the phase rotation may be determined such that the minimum distance between constellation points in a constellation map is maximized.

The above description is made with the example that a plurality of constellation maps are used when bit-to-symbol mapping is performed. According to another embodiment of the present disclosure, one constellation map may be used when bit-to-symbol mapping is performed.

Figure 6:
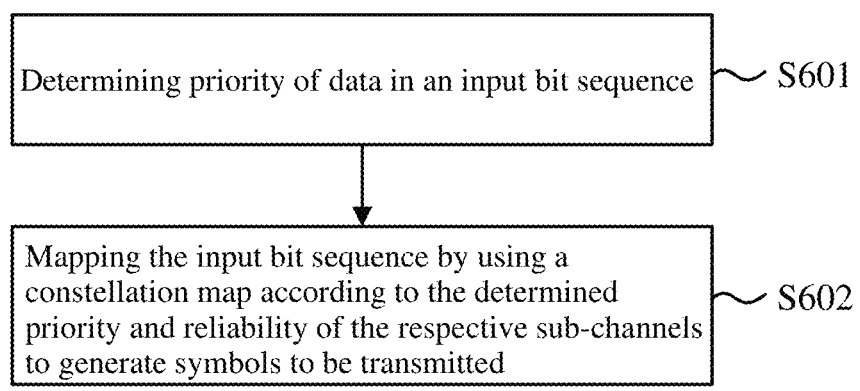
FIG. 6 is a flowchart illustrating a method for bit-to-symbol mapping according to another embodiment of the present disclosure.

A method for bit-to-symbol mapping according to another embodiment of the present disclosure will be described below with reference to FIG. 6. FIG. 6 is a flowchart illustrating the method 600 for bit-to-symbol mapping according to another embodiment of the present disclosure. In the example shown in FIG. 6, one symbol includes a plurality of sub-channels, and reliability of each of the plurality of sub-channels is different.

As shown in FIG. 6, in step S601, priority of data in an input bit sequence is determined. For example, the priority of the data in the input bit sequence may be determined according to importance of the data. Data of high importance in the input bit sequence may be set to a high priority, and data of low importance in the input bit sequence may be set to a low priority.

Then, in step S602, the input bit sequence may be mapped by using a constellation map according to the determined priority and reliability included in respective sub-channels to generate symbols to be transmitted. According to one example of the present disclosure, in step S602, data with a high priority in the input bit sequence may be mapped to a sub-channel with a high reliability in the symbol, and data with a low priority in the input bit sequence may be mapped to a sub-channel with a low reliability in the symbol.

For example, the number of bits included in each sub-channel may be different. In this case, since sub-channels including a larger number of bits have higher reliability for the same number of input bits, in step S602, data with a high priority in the input bit sequence may be mapped to a sub-channel including a larger number of bits in the symbol, and data with a lower priority in the input bit sequence may be mapped to a sub-channel including a smaller number of bits in the symbol. By setting the number of bits included in sub-channels of a symbol to make different sub-channels have different reliability, better performance may be brought in any possible capacity region, and even in a case where conflicts occur among a plurality of users, degradation of performance and capacity may also be avoided.

For example, in a case that mapping is performed by using a 16QAM constellation map, 4 bits may be included in one symbol. A first bit in the symbol may be preset as a first sub-channel, and a second to fourth bits in the symbol may be preset as a second sub-channel. Since the second sub-channel has more bits than the first sub-channel, the second sub-channel has a larger capacity than the first sub-channel, and thus has higher reliability when transmitting the same amount of information. Therefore, when bit-to-symbol mapping is performed, data with a higher priority may be mapped to the second sub-channel, and data with a lower priority may be mapped to the first sub-channel. Each sub-channel may transmit independent coded codewords.

Furthermore, according to another example of the present disclosure, the method shown in FIG. 6 may further comprise generating a plurality of information bit groups according to the input bit sequence. Data in the input bit sequence may be the plurality of information bit groups generated according to the input bit sequence. Specifically, according to step S601, priorities of the respective information bit groups generated according to the input bit sequence may be determined. According to step S602, the respective information bit groups are mapped by using a constellation map according to the determined priorities and reliability of the respective sub-channels to generate symbols to be transmitted.

Preferably, when setting respective sub-channels of one symbol, it is desirable that the set sub-channels are favorable for interference cancellation of data transmission. Each sub-channel may transmit independent codewords. When receiving the transmitted codewords, a receiving end may firstly decode a part of the codewords, and delete codewords that are decoded correctly to reduce interference and complexity of the receiving end when decoding the remaining codewords. According to one example of the present disclosure, respective sub-channels of one symbol are linearly separable. Specifically, a specific sub-channel of a plurality of sub-channels of one symbol has a plurality of values. A pattern of a first constellation map formed by remaining sub-channels obtained by deleting the specific sub-channel from the symbol when the value of the specific sub-channel is one value of the plurality of values is the same as a pattern of a second constellation map formed by remaining sub-channels obtained by deleting the specific sub-channel from the symbol when the value of the specific sub-channel is another value of the plurality of values. Herein, the specific sub-channel of the plurality of sub-channels may be any sub-channel of the plurality of sub-channels. Furthermore, one value and another value of the plurality of values of the sub-channel may be any value of the plurality of values of the sub-channel.

Figure 7:
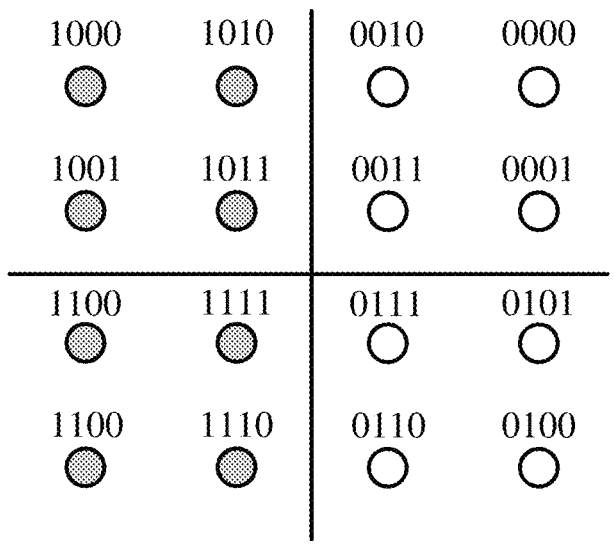
FIG. 7 illustrates constellation maps obtained by deleting a sub-channel in a 16QAM constellation map according to one example of the present disclosure.
Figure 7:
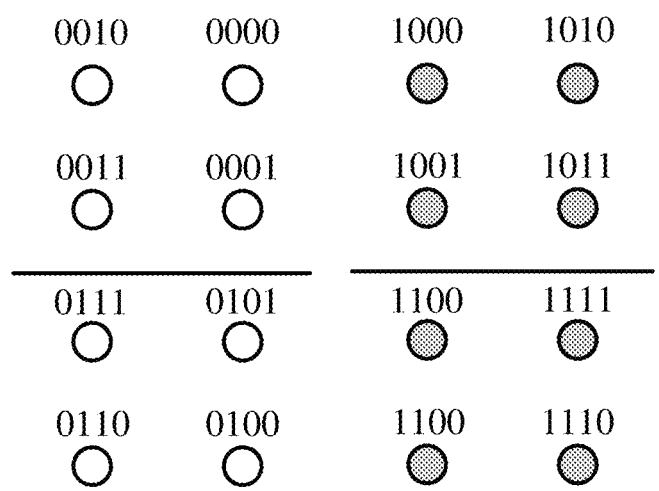

FIG. 7 illustrates a constellation map obtained by deleting a sub-channel in a 16QAM constellation map according to one example of the present disclosure. In the example shown in FIG. 7, a first bit in one symbol is preset as a first sub-channel, and a second to fourth bits in the symbol are preset as a second sub-channel. As shown in FIG. 7, the constellation map 710 is a 16QAM constellation map. It is assumed that the first sub-channel is decoded firstly at a receiving end. When bit values of bits included in the first sub-channel are 0, a constellation map 720 that may correspond to the second sub-channel may be obtained by deleting the first sub-channel from the 16QAM symbol, that is, determining the first sub-channel of the 16QAM symbol as the bit values "0" of the bits included in the first sub-channel. In addition, when the bit values of the bits included in the first sub-channel are 1, a constellation map 730 that may correspond to the second sub-channel may be obtained by deleting the first sub-channel from the 16QAM symbol, that is, determining the first sub-channel of the 16QAM symbol as the bit values "1" of the bits included in the first sub-channel. As shown in FIG. 7, the constellation map 720 and the constellation map 730 have the same pattern. Therefore, interference may be decreased when decoding the remaining codewords and complexity of the receiving end may be reduced.

Figure 8:
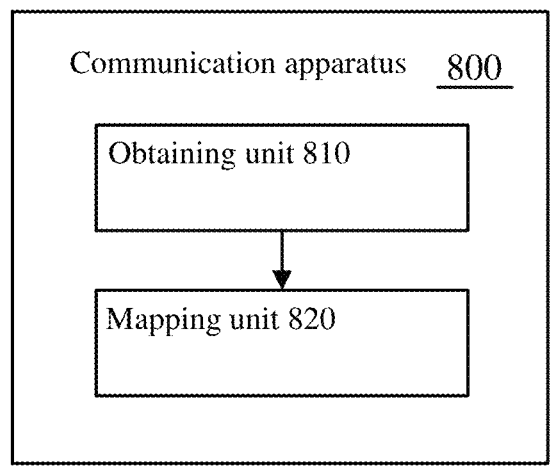
FIG. 8 is a block diagram illustrating a communication apparatus according to one embodiment of the present disclosure.

A communication apparatus according to one embodiment of the present disclosure will be described below with reference to FIG. 8. In the embodiments according to the present disclosure, the communication apparatus may be a mobile station, a base station, or the like. FIG. 8 is a block diagram illustrating the communication apparatus 800 according to one embodiment of the present disclosure. As shown in FIG. 8, the communication apparatus 800 comprises an obtaining unit 810 and a mapping unit 820. The communication apparatus 800 may comprise other components in addition to these two units, however, since these components are not related to the content of the embodiments of the present disclosure, illustration and description thereof are omitted herein. Furthermore, since specific details of the following operations performed by the communication apparatus 800 according to the embodiment of the present disclosure are the same as those described above with reference to FIGS. 1-5, repeated descriptions of the same details are omitted herein to avoid repetition.

In the example shown in FIG. 8, one symbol may optionally include a plurality of sub-channels, and the number of bits included in each of the plurality of sub-channels may be the same or different. For example, one symbol may include 3 sub-channels, and each sub-channel may include one bit. As another example, one symbol may include 2 sub-channels, where one sub-channel includes one bit and the other sub-channel includes two bits.

As shown in FIG. 8, the obtaining unit 810 may obtain a plurality of base constellation maps. According to one example of the present disclosure, a base constellation map may be an initial constellation map such as BPSK, QPSK, 16QAM, and the like. Alternatively, in addition to the initial constellation map, a base constellation may further include an adjustment factor such as a power factor and/or a phase rotation.

According to another example of the present disclosure, the communication apparatus 800 may further comprise an encoding unit (not shown). The encoding unit may generate a plurality of information bit groups according to an input bit sequence. In this case, the obtaining unit 810 may determine base constellation maps corresponding to respective information bit groups of the plurality of information bit groups.

For example, the base constellation maps corresponding to the plurality of information bit groups generated according to the input bit sequence may be preset. The obtaining unit 810 may determine, according to a preset setting, the base constellation maps corresponding to the respective information bit groups of the plurality of information bit groups. For example, it may be preset that a first information bit group of the plurality of information bit groups generated according to one input bit sequence corresponds to a BPSK constellation map, and a second information bit group of the bit sequence corresponds to a QPSK constellation map. Accordingly, the acquiring unit 810 may determine a BPSK constellation map for the first information bit group, and determine a QPSK constellation map for the second information bit group. Furthermore, each of the plurality of constellation maps may be the same. For example, it may be preset that the first information bit group of the plurality of information bit groups generated according to the input bit sequence corresponds to a BPSK constellation map, and the second information bit group of the plurality of information bit groups generated according to the input bit sequence corresponds to a BPSK constellation map. The obtaining unit 810 may determine a BPSK constellation map for a first bit and also determine a BPSK constellation map for a second bit according to a preset setting.

Furthermore, according to another example of the present disclosure, the plurality of base constellation maps may be candidate base constellation maps for one input bit sequence. As will be described later, base constellation maps used for mapping of the input bit sequence may be selected from the candidate base constellation maps according to a part of information bit groups of the plurality of information bit groups generated based on the input bit sequence.

Then, the mapping unit 820 may map the input bit sequence by using the plurality of base constellation maps to generate symbols to be transmitted.

As described above, according to one example of the present disclosure, the method shown in FIG. 1 may further comprise generating the plurality of information bit groups according to the input bit sequence. Furthermore, the plurality of base constellation maps obtained by the obtaining unit 810 may be candidate base constellation maps. The mapping unit 820 may select in the plurality of base constellation maps according to the part of information bit groups of the plurality of information bit groups, so as to obtain mapped symbols according to the selected base constellation maps. Specifically, the mapping unit 820 may determine a target constellation map in the plurality of base constellation maps according to the part of information bit groups of the plurality of information bit groups. According to one example of the present disclosure, the part of information bit groups of the plurality of information bit groups may be one or more information bit groups of the plurality of information bit groups, for example, the first information bit group of the input bit sequence, the first two information bit groups of the input bit sequence, or the last one or more information bit groups of the input bit sequence.

According to another example of the present disclosure, the target constellation map may be determined in the plurality of base constellation maps according to bit values of the part of information bit groups of the plurality of information bit groups. For example, a correspondence relationship between bit values and respective constellation maps of the plurality of base constellation maps may be preset. The mapping unit 820 may determine the target constellation map in the plurality of base constellation maps according to specific bit values of some bits of the input bit sequence according to the preset correspondence relationship.

For example, a constellation map corresponding to the bit value of 1 may be preset as a BPSK constellation map, and a constellation map corresponding to the bit value of 0 may be preset as a QPSK constellation map. The mapping unit 820 may determine, according to bit values of the first information bit group of the plurality of information bit groups, a target constellation map corresponding to the bit values from the plurality of base constellation maps.

As another example, as described above, each base constellation map includes an initial constellation map and adjustment factors including a power factor and/or a phase rotation and the like, which has been described above in detail in conjunction with Formula 1 and FIG. 3 and thus will be not repeatedly described herein.

Then, the mapping unit 820 may map other information bit groups of the plurality of information bit groups except the part of information bit groups by using the target constellation map to generate symbols to be transmitted, that is, to generate symbols corresponding to the entire input bit sequence. For example, assuming that two information bit groups are generated according to the input bit sequence, the mapping unit 820 may determine the target constellation map from the plurality of base constellation maps according to the first information bit group, and then the mapping unit 820 may determine corresponding symbols in the target constellation map as symbols mapped by the entire input bit sequence according to the second information bit group.

In this example, the target constellation map may be selected in the plurality of base constellation maps according to the part of information bit groups of the plurality of information bit groups generated based on the input bit sequence, to perform bit-to-symbol mapping, thereby bringing in better performance in any possible capacity region.

Furthermore, as described above, according to another example of the present disclosure, the plurality of base constellation maps may correspond to the respective information bit groups generated according to the input bit sequence, respectively. In this case, the mapping unit 820 may generate the symbols corresponding to the entire input bit sequence by superimposing initial constellation points obtained by mapping of the respective bits.

Specifically, the mapping unit 820 may map corresponding bit information groups by using respective determined constellation maps to obtain initial constellation points. For example, according to a preset setting, a BPSK constellation map may be determined for the first information bit group, and a QPSK constellation map may be determined for the second information bit group. The mapping unit 820 may map the first information bit group by using the BPSK constellation map to obtain first initial constellation points, and may map the second information bit group by using the QPSK constellation map to obtain second initial constellation points.

Then, the mapping unit 820 may superimpose the obtained initial constellation points to generate the symbols to be transmitted. In this example, initial constellation points corresponding to the respective information bit groups of the plurality of information bit groups generated according to the input bit sequence may be obtained according to the plurality of base constellation maps, and the symbols to be transmitted may be generated according to the initial constellation points, thereby bringing in better performance in any possible capacity region.

According to one example of the present disclosure, the mapping unit 820 may adjust the respective initial constellation points by adjustment factors, and then superimpose the adjusted initial constellation points to generate the symbols to be transmitted. Distances between constellation points corresponding to mapped symbols obtained by superimposing initial constellation points may be adjusted by adjusting values of adjustment factors, such as, power factors $a_1$ and $a_2$ and/or phase rotations and the like, so that different sub-channels of a symbol have different reliability, that is, rate splitting is achieved between different sub-channels of a symbol. Therefore, even in a case where conflicts occur among a plurality of users, degradation of performance and capacity may be avoided. This process has been described above in conjunction with Formula 2 and FIG. 5, which will not be repeatedly described herein.

According to one example of the present disclosure, the adjustment factors may be determined according to channel capacities required for respective sub-channels.

For example, different reliability may be preset for respective sub-channels of a symbol. Parameters such as Block Error Rates (BLERs) may be preset for the respective sub-channels of the symbol to indicate their reliability. Then, a corresponding system capacity is obtained according to the set reliability. For example, corresponding signal-to-interference-and-noise ratios (SINRs) may be determined according to the set reliability, and corresponding code rates may be obtained according to the determined SINRs to indicate the system capacity. Then, the adjustment factors are determined according to the obtained corresponding system capacity.

For example, for a fixed system noise, values of the power factors may be adjusted to meet the resultant system capacity. As another example, a phase rotation may be determined according to a channel noise. For example, the channel noise may be determined according to a received signal-to-noise ratio (SNR). Furthermore, the phase rotation may be determined such that the minimum distance between constellation points in a constellation map is maximized.

The above description is made with the example that a plurality of constellation maps are used when bit-to-symbol mapping is performed. According to another embodiment of the present disclosure, one constellation map may be used when bit-to-symbol mapping is performed.

A communication apparatus according to one embodiment of the present disclosure will be described below with reference to FIG. 8. In the embodiments according to the present disclosure, the communication apparatus may be a mobile station, a base station, or the like. FIG. 8 is a block diagram illustrating the communication apparatus 800 according to one embodiment of the present disclosure. As shown in FIG. 8, the communication apparatus 800 comprises an obtaining unit 810 and a mapping unit 820. The communication apparatus 800 may comprise other components in addition to these two units, however, since these components are not related to the content of the embodiments of the present disclosure, illustration and description thereof are omitted herein. Furthermore, since specific details of the following operations performed by the communication apparatus 800 according to the embodiment of the present disclosure are the same as those described above with reference to FIGS. 1-5, repeated descriptions of the same details are omitted herein to avoid repetition.

Figure 9:
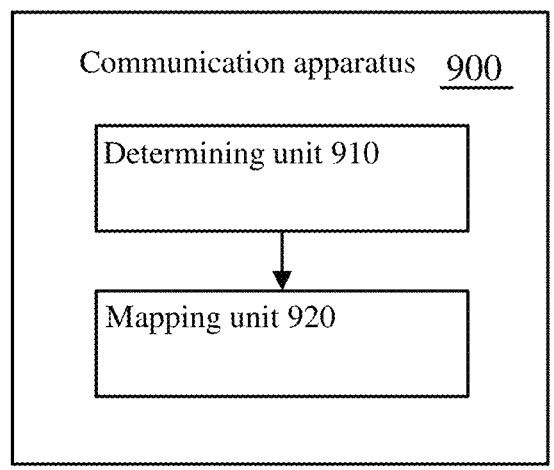
FIG. 9 is a block diagram illustrating a communication apparatus according to another embodiment of the present disclosure.

A communication apparatus according to another embodiment of the present disclosure will be described below with reference to FIG. 9. In the embodiments according to the present disclosure, the communication apparatus may be a mobile station, a base station, or the like. FIG. 9 is a block diagram illustrating the communication apparatus 900 according to another embodiment of the present disclosure. As shown in FIG. 9, the communication apparatus 900 comprises a determining unit 910 and a mapping unit 920. The communication apparatus 900 may comprise other components in addition to these two units, however, since these components are not related to the content of the embodiments of the present disclosure, illustration and description thereof are omitted herein. Furthermore, since specific details of the following operations performed by the communication apparatus 900 according to the embodiment of the present disclosure are the same as those described above with reference to FIGS. 6-7, repeated descriptions of the same details are omitted herein to avoid repetition.

In the example shown in FIG. 9, one symbol includes a plurality of sub-channels, and reliability of each of the plurality of sub-channels is different.

As shown in FIG. 9, the determining unit 910 determines priority of data in an input bit sequence. For example, the priority of the data in the input bit sequence may be determined according to importance of the data. Data of high importance in the input bit sequence may be set to a high priority, and data of low importance in the input bit sequence may be set to a low priority.

Then, the mapping unit 920 maps the input bit sequence by using a constellation map according to the determined priority and reliability included in respective sub-channels to generate symbols to be transmitted. According to one example of the present disclosure, the mapping unit 920 may map data with a high priority in the input bit sequence to a sub-channel with a high reliability in the symbol, and map data with a low priority in the input bit sequence to a sub-channel with a low reliability in the symbol.

For example, the number of bits included in each sub-channel may be different. In this case, since sub-channels including a larger number of bits have higher reliability for the same number of input bits, the mapping unit 920 may map data with a high priority in the input bit sequence to a sub-channel including a larger number of bits in the symbol, and map data with a lower priority in the input bit sequence to a sub-channel including a smaller number of bits in the symbol. By setting the number of bits included in sub-channels of a symbol to make different sub-channels have different reliability, better performance may be brought in any possible capacity region, and even in a case where conflicts occur among a plurality of users, degradation of performance and capacity may also be avoided.

For example, in a case that mapping is performed by using a 16QAM constellation map, 4 bits may be included in one symbol. A first bit in the symbol may be preset as a first sub-channel, and a second to fourth bits in the symbol may be preset as a second sub-channel. Since the second sub-channel has more bits than the first sub-channel, the second sub-channel has a larger capacity than the first sub-channel, and thus has higher reliability when transmitting the same amount of information. Therefore, when bit-to-symbol mapping is performed, data with a higher priority may be mapped to the second sub-channel, and data with a lower priority may be mapped to the first sub-channel. Each sub-channel may transmit independent coded codewords.

Furthermore, according to another example of the present disclosure, the communication apparatus shown in FIG. 9 may further comprise an encoding unit (not shown). The encoding unit may generate a plurality of information bit groups according to the input bit sequence. Data in the input bit sequence may be the plurality of information bit groups generated according to the input bit sequence. Specifically, the determining unit 910 may determine priorities of the respective information bit groups generated according to the input bit sequence. Then, the mapping unit 920 maps the respective information bit groups by using a constellation map according to the determined priorities and reliability of the respective sub-channels to generate symbols to be transmitted.

Preferably, when setting respective sub-channels of one symbol, it is desirable that the set sub-channels are favorable for interference cancellation of data transmission. Each sub-channel may transmit independent codewords. When receiving the transmitted codewords, a receiving end may firstly decode a part of the codewords, and delete codewords that are decoded correctly to reduce interference and complexity of the receiving end when decoding the remaining codewords. According to one example of the present disclosure, respective sub-channels of one symbol are linearly separable. Specifically, a specific sub-channel of a plurality of sub-channels of one symbol has a plurality of values. A pattern of a first constellation map formed by remaining sub-channels obtained by deleting the specific sub-channel from the symbol when the value of the specific sub-channel is one value of the plurality of values is the same as a pattern of a second constellation map formed by remaining sub-channels obtained by deleting the specific sub-channel from the symbol when the value of the specific sub-channel is another value of the plurality of values. Herein, the specific sub-channel of the plurality of sub-channels may be any sub-channel of the plurality of sub-channels. Furthermore, one value and another value of the plurality of values of the sub-channel may be any value of the plurality of values of the sub-channel.

<Hardware Structure>

Figure 10:
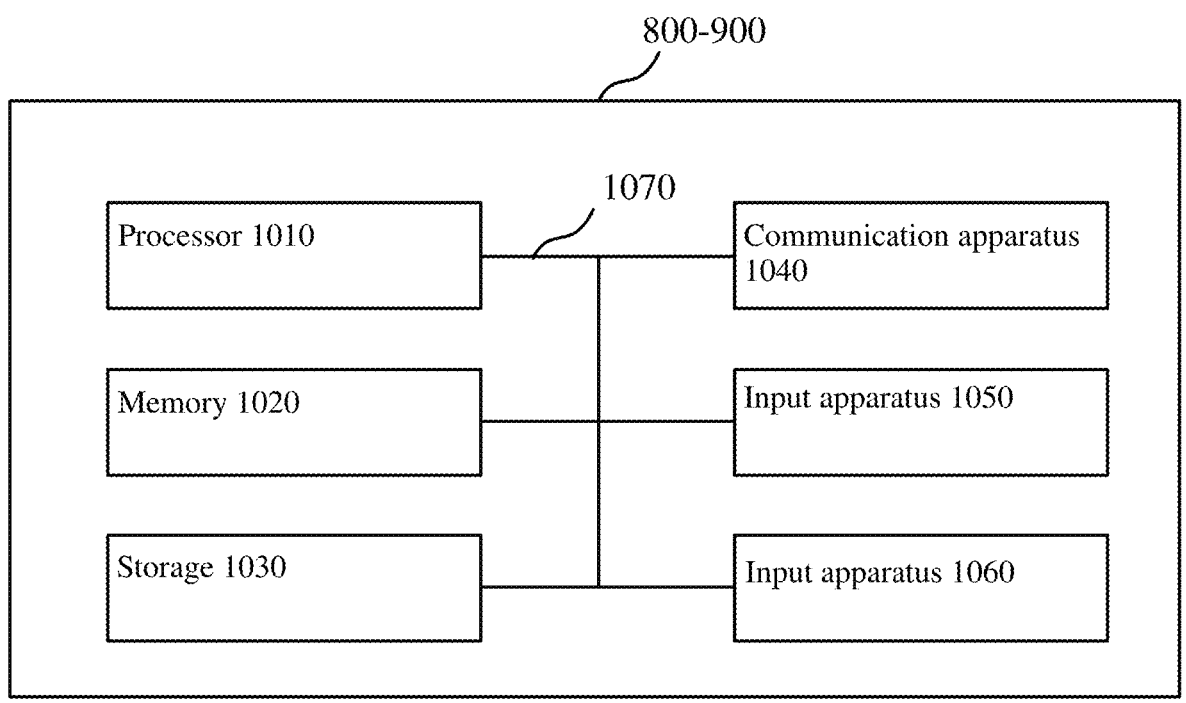
FIG. 10 is a diagram illustrating one example of a hardware structure of a communication apparatus involved in one implementation of the present disclosure.

The base station, the user terminal and the like in one embodiment of the present disclosure may function as a computer that executes the processes of the wireless communication method of the present disclosure. FIG. 10 is a diagram illustrating an example of a hardware structure of a communication apparatus involved in one embodiment of the present disclosure. Any of the above communication apparatuses 800 and 900 may be constituted as a computer apparatus that physically comprises a processor 1010, a memory 1020, a storage 1030, a communication apparatus 1040, an input apparatus 1050, an output apparatus 1060, a bus 1070 and the like In addition, in the following description, terms such as "apparatus" may be replaced with circuits, devices, units, and the like. A hardware structure of the mobile station 1000 may include one or more of the respective apparatuses shown in the figure, or may not include a part of the apparatuses.

For example, only one processor 1010 is illustrated, but there may be multiple processors. Furthermore, processes may be performed by one processor, or processes may be performed by more than one processor simultaneously, sequentially, or by other methods. In addition, the processor 1010 may be installed by more than one chip.

Respective functions of the mobile station 1000 may be implemented, for example, by reading specified software (program) on hardware such as the processor 1010 and the memory 1020, so that the processor 1010 performs computations, controls communication performed by the communication apparatus 1040, and controls reading and/or writing of data in the memory 1020 and the storage 1030.

The processor 1010, for example, operates an operating system to control the entire computer. The processor 1010 may be constituted by a Central Processing Unit (CPU), which includes interfaces with peripheral apparatuses, a control apparatus, a computing apparatus, a register and the like. For example, the obtaining unit 810, the mapping unit 820, the determining unit 910, the mapping unit 920 and the like described above may be implemented by the processor 1010.

In addition, the processor 1010 reads programs (program codes), software modules and data from the storage 1030 and/or the communication apparatus 1040 to the memory 1020, and execute various processes according to them. As for the program, a program causing computers to execute at least a part of the operations described in the above embodiments may be employed.

The memory 1020 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 1020 may also be referred to as a register, a cache, a main memory (a main storage apparatus) and the like. The memory 1020 may store executable programs (program codes), software modules and the like for implementing wireless communication methods involved in one embodiment of the present disclosure.

The storage 1030 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 1030 may also be referred to as an auxiliary storage apparatus.

The communication apparatus 1040 is a hardware (transceiver device) performing communication between computers via a wired and/or wireless network, and is also referred to as a network device, a network controller, a network card, a communication module and the like, for example. The communication device 1040 may include a high-frequency switch, a duplexer, a filter, a frequency synthesizer and the like to implement, for example, Frequency Division Duplex (FDD) and/or Time Division Duplex (TDD). For example, the transmitting unit 710, the receiving unit 810 and the like described above may be implemented by the communication apparatus 1040.

The input apparatus 1050 is an input device (e.g., a keyboard, a mouse, a microphone, a switch, a button, a sensor and the like) that receives input from the outside. The output apparatus 1060 is an output device (e.g., a display, a speaker, a Light Emitting Diode (LED) light and the like) that performs outputting to the outside. In addition, the input apparatus 1050 and the output apparatus 1060 may also be an integrated structure (e.g., a touch screen).

Furthermore, the respective apparatuses such as the processor 1010 and the memory 1020 are connected by the bus 1070 that communicates information. The bus 1070 may be constituted by a single bus or by different buses between the apparatuses.

Furthermore, the mobile station 1000 may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 1010 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

In addition, a radio frame may be composed of one or more periods (frames) in the time domain. Each of the one or more periods (frames) constituting the radio frame may also be referred to as a subframe. Further, a subframe may be composed of one or more slots in the time domain. The subframe may be a fixed length of time duration (e.g., 1 ms) that is independent of the numerology.

Furthermore, a slot may be composed of one or more symbols (OFDM (Orthogonal Frequency Division Multiplexing) symbols, SC-FDMA (Single Carrier Frequency Division Multiple Access) symbols, etc.) in the time domain. Furthermore, the slot may also be a time unit based on the numerology. Furthermore, the slot may also include a plurality of microslots. Each microslot may be composed of one or more symbols in the time domain. Furthermore, a microslot may also be referred to as a "subframe".

A radio frame, a subframe, a slot, a microslot and a symbol all represent a time unit during signal transmission. A radio frame, a subframe, a slot, a microslot and a symbol may also use other names that correspond to them, respectively. For example, one subframe may be referred to as a "transmission time interval (TTI)", a plurality of consecutive subframes may also be referred to as a "TTI", and one slot or one microslot may also be referred to as a "TTI." That is, a subframe and/or a TTI may be a subframe (1 ms) in the existing LTE, may be a period of time shorter than 1 ms (e.g., 1 to 13 symbols), or may be a period of time longer than 1 ms. In addition, a unit indicating a TTI may also be referred to as a slot, a microslot and the like instead of a subframe.

Herein, a TTI refers to the minimum time unit of scheduling in wireless communication, for example. For example, in LTE systems, a wireless base station performs scheduling for respective user terminals that allocates radio resources (such as frequency bandwidths and transmission power that can be used in respective user terminals) in units of TTI. In addition, the definition of the TTI is not limited thereto.

The TTI may be a transmission time unit of channel-coded data packets (transport blocks), code blocks, and/or codewords, or may be a processing unit of scheduling, link adaptation and so on. In addition, when the TTI is given, a time interval (e.g., the number of symbols) mapped to transport blocks, code blocks, and/or codewords actually may also be shorter than the TTI.

In addition, when one slot or one microslot is called a TTI, more than one TTI (i.e., more than one slot or more than one microslot) may also become the minimum time unit of scheduling. Furthermore, the number of slots (the number of microslots) constituting the minimum time unit of the scheduling may be controlled.

A TTI having a time duration of 1 ms may also be referred to as a normal TTI (TTI in LTE Rel. 8-12), a standard TTI, a long TTI, a normal subframe, a standard subframe, or a long subframe, and so on. A TTI that is shorter than a normal TTI may also be referred to as a compressed TTI, a short TTI, a partial (or fractional) TTI, a compressed subframe, a short subframe, a microslot, a subslot, and so on.

In addition, a long TTI (e.g., a normal TTI, a subframe, etc.) may also be replaced with a TTI having a time duration exceeding 1 ms, and a short TTI (e.g., a compressed TTI, etc.) may also be replaced with a TTI having a TTI duration shorter than the long TTI and longer than 1 ms.

A resource block (RB) is a resource allocation unit in the time domain and the frequency domain, and may include one or more consecutive subcarriers in the frequency domain. Also, an RB may include one or more symbols in the time domain, and may be one slot, one microslot, one subframe or one TTI duration. One TTI and one subframe may be composed of one or more resource blocks, respectively. In addition, one or more RBs may also be referred to as "physical resource blocks (PRBs (Physical RBs))", "Sub-Carrier Groups (SCGs)", "Resource Element Groups (REGs)", "PRG pairs", "RB pairs" and so on.

Furthermore, a resource block may also be composed of one or more resource elements (REs). For example, one RE may be a radio resource area of one subcarrier and one symbol.

In addition, structures of the radio frames, subframes, slots, microslots and symbols, etc. described above are simply examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration may be variously altered.

Furthermore, the information, parameters and so on described in this specification may be represented in absolute values or in relative values with respect to specified values, or may be represented by other corresponding information. For example, radio resources may be indicated by specified indices. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limited in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a control table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The base station is sometimes referred to as terms such as a fixed station, a NodeB, an eNodeB (eNB), an access point, a transmitting point, a receiving point, a femto cell, a small cell and the like.

The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may also be applied. Also, the user terminal in this specification may be replaced with a wireless base station.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM® (Global System for Mobile communications), CDMA 2000, UMB (Ultra Mobile Broadband), IEEE 802.11 (Wi-Fi®), IEEE 802.16 (WiMAX®), IEEE 802.20, UWB (Ultra-WideBand), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A terminal comprising:
a processor; and
a storage medium having computer program instructions stored thereon, wherein the computer program instructions, when executed by the processor, perform processing of:
obtaining a plurality of base constellation maps;
mapping an input bit sequence by using the plurality of base constellation maps to generate symbols to be transmitted; and
generating a plurality of information bit groups according to the input bit sequence;
wherein the processor determines a target constellation map in the plurality of base constellation maps according to a part of information bit groups of the plurality of information bit groups, and maps other information bit groups of the plurality of information bit groups except the part of information bit groups by using the target constellation map to generate the symbols to be transmitted.

2. The terminal of claim 1, further comprising:
wherein the processor is further configured to generate a plurality of information bit groups according to the input bit sequence, wherein
obtaining unit determines base constellation maps corresponding to respective information bit groups of the plurality of information bit groups, maps corresponding information bit groups by using the determined constellation maps, respectively, to obtain initial constellation points, and superimposes the obtained initial constellation points to generate the symbols to be transmitted.

3. The terminal of claim 1, wherein each of the plurality of base constellation maps includes:
an initial constellation map and an adjustment factor.

4. The terminal of claim 2, wherein the processor is configured to adjust the respective initial constellation points by adjustment factors, and superimpose the adjusted initial constellation points to generate the symbols to be transmitted.

5. The terminal of claim 4, wherein
the adjustment factors include power factors and/or phase rotations.

6. The terminal of claim 5, wherein
a plurality of sub-channels are included in one symbol, and
the adjustment factors are determined according to channel capacities required for the respective sub-channels.

7. A terminal comprising:
a processor; and
a storage medium having computer program instructions stored thereon, wherein the computer program instructions, when executed by the processor, perform processing of:
determining priority of data in an input bit sequence; and
mapping the input bit sequence by using a constellation map according to the determined priority and reliability of respective sub-channels included in one symbol to generate symbols to be transmitted,
wherein a specific sub-channel of the plurality of sub-channels has a plurality of values, and
wherein a pattern of a first constellation map formed by remaining sub-channels other than the specific sub-channel from the plurality of sub-channels when a value of the specific sub-channel is one value of the plurality of values is the same as a pattern of a second constellation map formed by remaining sub-channels other than the specific sub-channel from the plurality of sub-channels when a value of the specific sub-channel is another value of the plurality of values.

8. The terminal of 7, wherein the processor is configured to map data with a high priority in the input bit sequence to a sub-channel with a high reliability in the symbol, and map data with a low priority in the input bit sequence to a sub-channel with a low reliability in the symbol.

9. A base station comprising:
a processor; and
a storage medium having computer program instructions stored thereon, wherein the computer program instructions, when executed by the processor, perform processing of:
obtaining a plurality of base constellation maps;
mapping an input bit sequence by using the plurality of base constellation maps to generate symbols to be transmitted; and
generating a plurality of information bit groups according to the input bit sequence,
wherein the processor determines a target constellation map in the plurality of base constellation maps according to a part of information bit groups of the plurality of information bit groups, and maps other information bit groups of the plurality of information bit groups except the part of information bit groups by using the target constellation map to generate the symbols to be transmitted.

10. The base station of claim 9, wherein each of the plurality of base constellation maps includes:
an initial constellation map and an adjustment factor.

11. The base station of claim 9,
wherein the processor is further configured to generate a plurality of information bit groups according to the input bit sequence, wherein
the processor determines base constellation maps corresponding to respective information bit groups of the plurality of information bit groups; the mapping unit maps corresponding information bit groups by using the determined constellation maps, respectively, to obtain initial constellation points, and superimposes the obtained initial constellation points to generate the symbols to be transmitted.

12. The base station of claim 11, wherein the processor is configured to adjust the respective initial constellation points by adjustment factors, and superimpose the adjusted initial constellation points to generate the symbols to be transmitted.

13. The base station of claim 12, wherein
the adjustment factors include power factors and/or phase rotations.

14. The base station of claim 13, wherein
a plurality of sub-channels are included in one symbol, and
the adjustment factors are determined according to channel capacities required for the respective sub-channels.

* * * * *